(12) United States Patent
Ugawa et al.

(10) Patent No.: US 8,228,420 B2
(45) Date of Patent: Jul. 24, 2012

(54) LENS DRIVER, CAMERA MODULE, IMAGING APPARATUS, AND CAMERA-EQUIPPED MOBILE TERMINAL

(75) Inventors: Koji Ugawa, Kanagawa (JP); Fujio Kanai, Kanagawa (JP)

(73) Assignee: Sony Corporation (JP)

( * ) Notice: Subject to any disclaimer, the term of this patent is extended or adjusted under 35 U.S.C. 154(b) by 312 days.

(21) Appl. No.: 12/586,666

(22) Filed: Sep. 25, 2009

(65) Prior Publication Data

US 2010/0079660 A1   Apr. 1, 2010

(30) Foreign Application Priority Data

Sep. 29, 2008 (JP) ................................ P2008-251865

(51) Int. Cl.
H04N 5/232 (2006.01)
H04N 13/00 (2006.01)

(52) U.S. Cl. ........................................................ 348/357

(58) Field of Classification Search .................... 348/357
See application file for complete search history.

(56) References Cited

U.S. PATENT DOCUMENTS

| | | | | |
|---|---|---|---|---|
| 4,730,175 A * | 3/1988 | Ichikawa et al. | ............. | 335/230 |
| 5,289,318 A * | 2/1994 | Sekine et al. | ................. | 359/813 |
| 7,505,215 B2 * | 3/2009 | Sanou et al. | ................... | 359/694 |
| 7,570,880 B2 * | 8/2009 | Yoon et al. | ..................... | 396/133 |
| 7,596,309 B2 * | 9/2009 | Hsiao et al. | ................... | 396/133 |
| 7,599,615 B2 * | 10/2009 | Hsiao et al. | ................... | 396/133 |
| 2006/0153556 A1 * | 7/2006 | Lee et al. | ....................... | 396/133 |
| 2006/0245085 A1 * | 11/2006 | Lee et al. | ...................... | 359/813 |
| 2007/0177279 A1 * | 8/2007 | Cho et al. | ....................... | 359/692 |
| 2007/0216799 A1 * | 9/2007 | Honma | .......................... | 348/374 |
| 2008/0024016 A1 * | 1/2008 | Liu et al. | .......................... | 310/15 |
| 2008/0055753 A1 * | 3/2008 | Takahashi et al. | ............ | 359/824 |
| 2008/0117535 A1 * | 5/2008 | Osaka et al. | .................. | 359/824 |
| 2008/0186601 A1 * | 8/2008 | Honma | .......................... | 359/824 |
| 2008/0204590 A1 * | 8/2008 | Toya et al. | .................... | 348/373 |
| 2008/0212959 A1 * | 9/2008 | Shin et al. | ...................... | 396/508 |
| 2008/0297642 A1 * | 12/2008 | Osaka | ........................... | 348/335 |

(Continued)

FOREIGN PATENT DOCUMENTS

JP  2004-138992 A  5/2004

(Continued)

OTHER PUBLICATIONS

Office Action from Japanese Application No. 2008-251865, dated Aug. 10, 2010.

(Continued)

*Primary Examiner* — Sinh Tran
*Assistant Examiner* — Jason Flohre
(74) *Attorney, Agent, or Firm* — Lerner, David, Littenberg, Krumholz & Mentlik, LLP

(57) ABSTRACT

A lens driver includes: an imaging lens; a housing accommodating the lens; a spring member provided between the lens and the housing and holding the lens in the housing movably in the optical axis direction; a coil moving the lens in the optical axis direction; a magnet spaced apart from the coil and moving the lens in the optical axis direction; and a yoke fixed to the magnet and having an L-shaped cross-section when taken along a plane including the optical axis, wherein the yoke is disposed in such a way that an L-shaped corner side is located on the opposite side to the position of the lens where the reaction force of the spring member resulting from the movement of the lens is maximized.

1 Claim, 9 Drawing Sheets

U.S. PATENT DOCUMENTS

2009/0122420 A1 * 5/2009 Sue et al. .................. 359/696

FOREIGN PATENT DOCUMENTS

| | | | |
|---|---|---|---|
| JP | 2006079072 A | 3/2006 | |
| JP | 2006301584 A | 11/2006 | |
| JP | 2007121853 A | 5/2007 | |
| JP | 2007171764 A | 7/2007 | |
| JP | 2008-040077 A | 2/2008 | |
| JP | 2008058659 A | 3/2008 | |
| JP | 2008116901 A | 5/2008 | |
| WO | 2006/025161 A1 | 3/2006 | |

OTHER PUBLICATIONS

Office Action from Japanese Application No. 2008-251865, dated Nov. 2, 2010.

European Search Report, EP 09171598, Dec. 18, 2009.

* cited by examiner

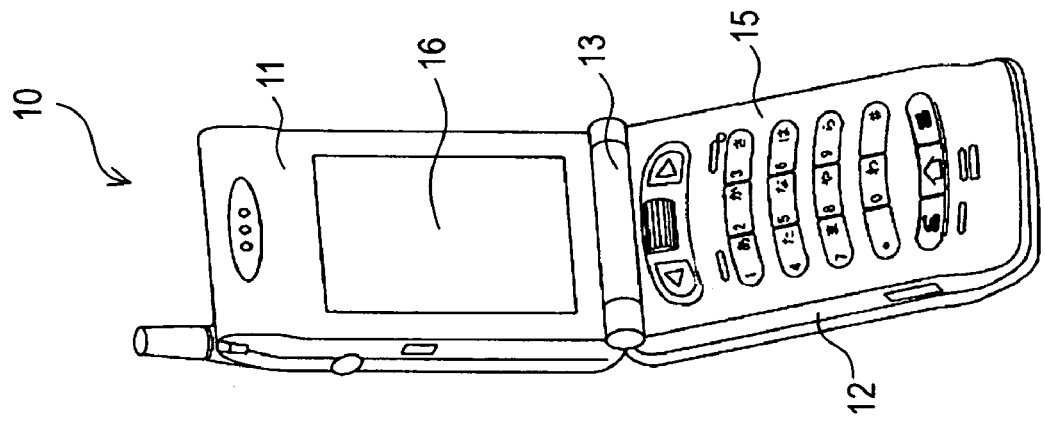
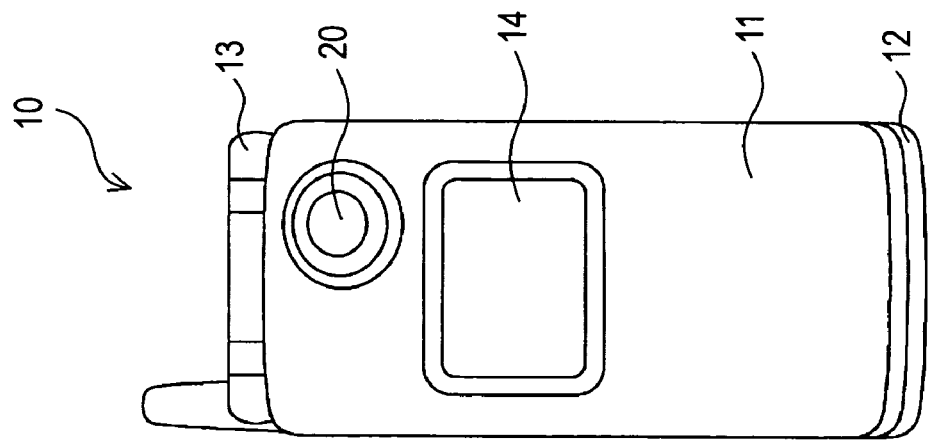

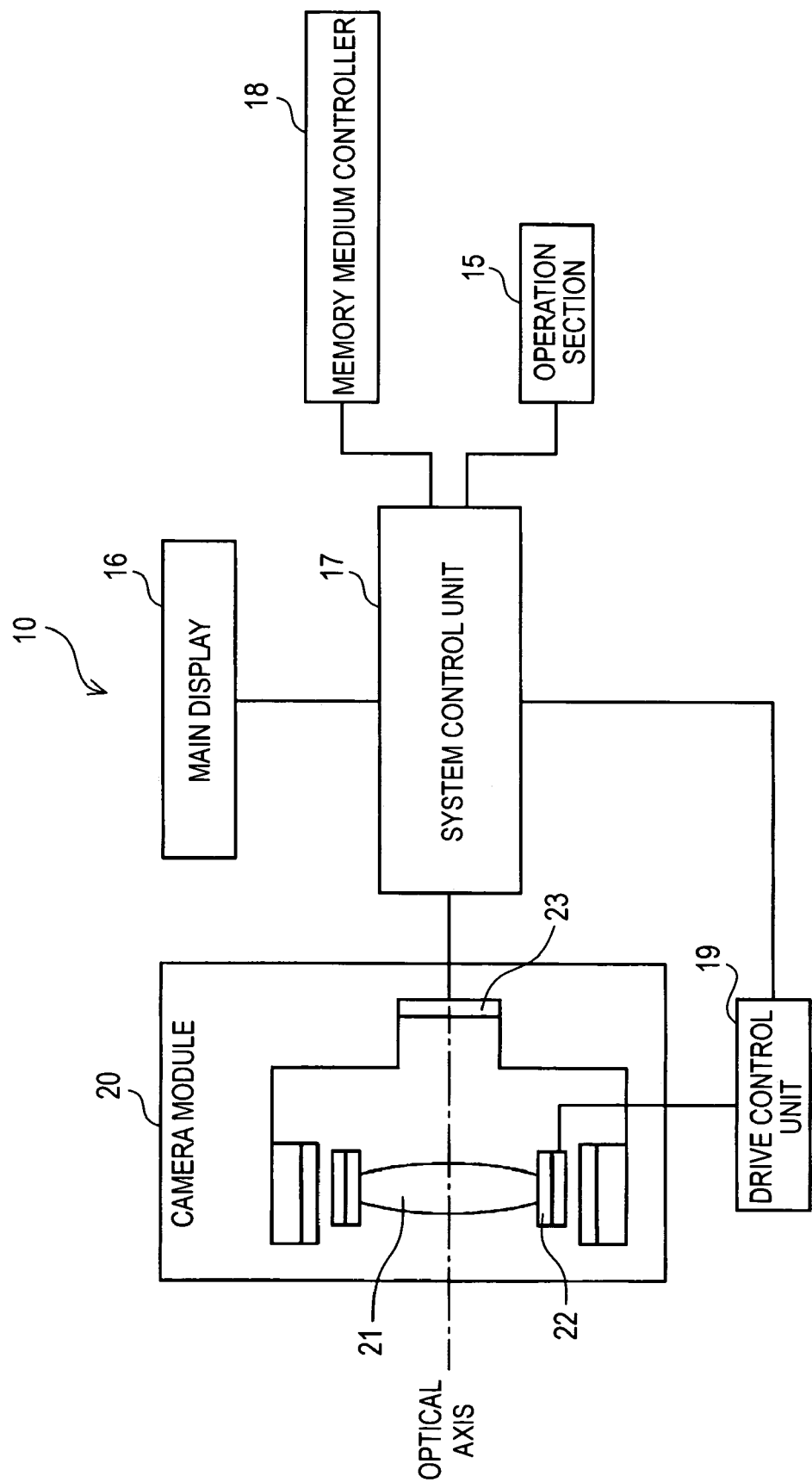

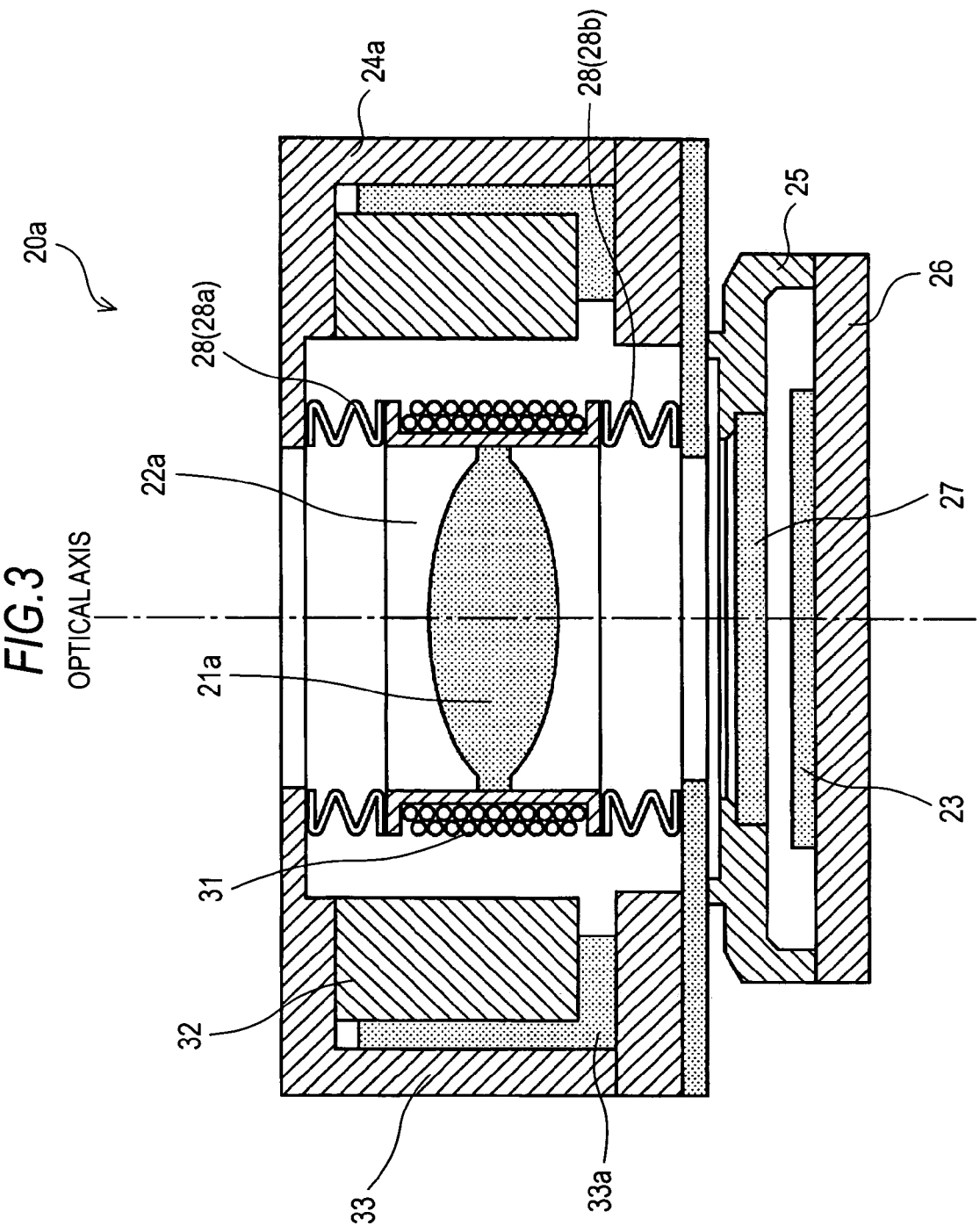

LENS DRIVER, CAMERA MODULE, IMAGING APPARATUS, AND CAMERA-EQUIPPED MOBILE TERMINAL

CROSS-REFERENCE TO RELATED APPLICATION

The present application claims priority from Japanese Patent Application No. JP 2008-251865 filed in the Japanese Patent Office on Sep. 29, 2008, the entire content of which is incorporated herein by reference.

BACKGROUND OF THE INVENTION

1. Field of the Invention

The present invention relates to a lens driver capable of moving a lens by using an electromagnetic force produced by a coil, a magnet, and a yoke, a camera module, an imaging apparatus, and a camera-equipped mobile terminal, and particularly to a technology that readily allows size reduction and efficient lens motion.

2. Description of the Related Art

In recent years, a variety of camera-related apparatus have been popular, for example, imaging apparatus, such as digital still cameras and video camcorders, and camera-equipped mobile terminals, such as mobile phones, PDAs (Personal Digital Assistants), and notebook personal computers into which a camera module is incorporated. Among these apparatus, an apparatus with an autofocus function and a zoom function has lens drivers incorporated therein to move the entire optical system formed of a plurality of lenses, a single lens or a group of lenses for focusing, and a single lens or a group of lenses for zooming in the optical axis direction.

In a lens driver used for the purposes described above, a linear motor is used to move a lens in the optical axis direction. A linear motor is advantageous in that the magnetic flux focuses well and the magnetic flux flowing through a yoke tends to be uniform. Among a variety of linear motors, a voice-coil linear motor, which is advantageous for space saving, is commercially used in an imaging apparatus having an autofocus function and a zoom function and other apparatus.

In a linear motor-based lens driver using a known technology, a lens holder holds a lens unit and a guide shaft supports the lens holder movably in the optical axis direction. In this technology, a linear motor formed of a coil, a magnet, and a yoke moves the lens holder in the optical axis direction, and a magnetic member holds the positioned lens holder (see JP-A-2008-40077, for example).

SUMMARY OF THE INVENTION

However, in the technology described in JP-A-2008-40077, guide shafts are used to support the lens holder movably in the optical axis direction. To this end, a space is necessary to accommodate the guide shafts in the lens driver. An effort to reduce the lens driver in size is therefore limited. Further, the necessity to insert the guide shafts through the lens holder complicates the shape of the lens holder and increases the number of parts. Moreover, in the technology described in JP-A-2008-40077, positioning the magnet and the yoke is not carefully considered at all, resulting in poor positioning accuracy. As a result, the productivity deteriorates and the cost increases disadvantageously.

Further, there is an increasing need in recent years to reduce imaging apparatus and camera-equipped mobile terminals in size and hence a strong demand for smaller lens drivers incorporated therein. The ongoing miniaturization has reduced the volume of linear motors (coils and magnets), and the reduction in volume makes it difficult for the actuator to achieve a thrust force necessary for an autofocus functions and a zoom function. In particular, a big challenge in a camera module is to achieve a necessary thrust force when the load on the actuator is maximized (in a macro-imaging mode in which the lens holder is pulled out, for example).

It is therefore desirable to provide a technology that allows a camera module to be reduced in size, excels in cost effectiveness and productivity, and allows a thrust force necessary and sufficient for an autofocus function and a zoom function to be provided.

The invention addresses the above-identified and other problems and is embodied, for example, as the following embodiments.

A lens driver according to an embodiment of the invention includes an imaging lens, a housing accommodating the lens, a spring member provided between the lens and the housing and holing the lens in the housing movably in the optical axis direction, a coil moving the lens in the optical axis direction, a magnet spaced apart from the coil and moving the lens in the optical axis direction, and a yoke fixed to the magnet and having an L-shaped cross-section when taken along a plane including the optical axis. The yoke is disposed in such a way that an L-shaped corner side is located on the opposite side to the position of the lens where the reaction force of the spring member resulting from the movement of the lens is maximized.

A camera module according to an embodiment of the invention includes an imaging lens, an imaging device disposed in a position on the optical axis of the lens, a housing accommodating the lens, a spring member provided between the lens and the housing and holing the lens in the housing movably in the optical axis direction, a coil moving the lens in the optical axis direction, a magnet spaced apart from the coil and moving the lens in the optical axis direction, and a yoke fixed to the magnet and having an L-shaped cross-section when taken along a plane including the optical axis. The yoke is disposed in such a way that an L-shaped corner side is located on the opposite side to the position of the lens where the reaction force of the spring member resulting from the movement of the lens is maximized. An imaging apparatus according to an embodiment of the invention has the configuration described above, and a camera-equipped mobile terminal according to an embodiment of the invention has the configuration described above.

In the embodiments of the invention described above, the spring member is provided to hold the lens in the housing movably in the optical axis direction. Therefore, unlike the related art (the technology described in JP-A-2008-40077), no guide shaft is necessary to hold the lens movably in the optical axis direction.

In the embodiments of the invention described above, the coil, the magnet, and the yoke are provided to move the lens in the optical axis direction. The yoke has an L-shaped cross-section when taken along a plane including the optical axis. The magnet can therefore be readily positioned with respect to the yoke by using the inner surface of the L shape.

Further, the yoke is disposed in such a way that the L-shaped corner side is located on the opposite side to the position of the lens where the reaction force of the spring member resulting from the movement of the lens is maximized. Therefore, an adverse effect due to the L-shaped corner side, that is, attracting the magnetic flux from the magnet reduces the thrust force of the actuator, can be minimized.

According to the embodiments of the invention described above, providing the spring member capable of holding the lens movably in the optical axis direction without using a guide shaft allows size reduction. Further, since the yoke having an L-shaped cross-section when taken along a plane including the optical axis simplifies the positioning of the magnet with respect to the yoke, the cost effectiveness and productivity can be improved. Moreover, since locating the L-shaped corner side on the opposite side to the position of the lens where the reaction force of the spring member is maximized allows the adverse effect due to the L-shaped corner side to be minimized, a thrust force necessary and sufficient for an autofocus function and a zoom function can be obtained.

BRIEF DESCRIPTION OF THE DRAWINGS

FIGS. 1A and 1B are perspective views showing a camera-equipped mobile phone as an embodiment of the imaging apparatus and the camera-equipped mobile terminal of the invention;

FIG. 2 is a block diagram showing the configuration of a camera control system for controlling the camera-equipped mobile phone as an embodiment of the imaging apparatus and the camera-equipped mobile terminal of the invention;

FIG. 3 is a cross-sectional view of a camera module taken along a plane including the optical axis as an embodiment (first embodiment) of the camera module (lens driver) of the invention;

DESCRIPTION OF THE PREFERRED EMBODIMENTS

Figure 4A:
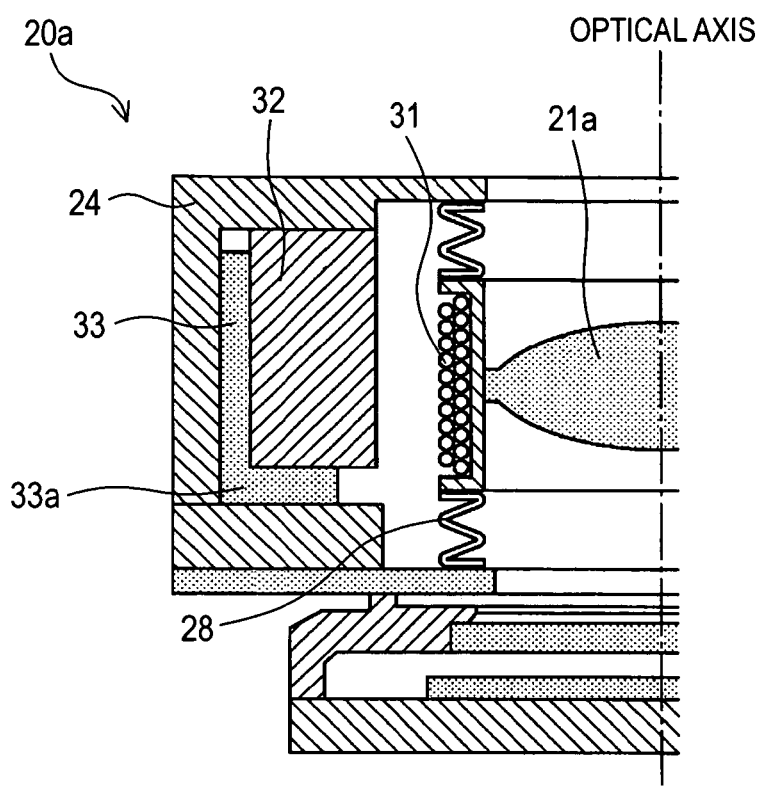
FIGS. 4A and 4B are cross-sectional views taken along a plane including the optical axis and describing an advantageous effect provided by the shape of a yoke in the camera module of the first embodiment.

The best mode (hereinafter referred to as an embodiment) for carrying out the invention will be described below with reference to the drawings.

An imaging apparatus and a camera-equipped mobile terminal in the following embodiments of the invention are a camera-equipped mobile phone 10. A camera module in the following embodiments of the invention is a camera module 20 (20*a*, 20*b*, 20*c*, and 20*d*) incorporated in the camera-equipped mobile phone 10. A lens driver according to an embodiment of the invention is part of the camera module 20. The description will be made in the following orders:

1. First embodiment (camera module 20*a*: an example in which a coil is provided on the lens side)

2. Second embodiment (camera module 20*b*: an example in which a magnet is provided on the lens side)

3. Third embodiment (camera module 20*c*: an example in which a lens holder is omitted)

4. Fourth embodiment (camera module 20*d*: an example in which part of a lens is movable)

[Example of Exterior of Imaging Apparatus and Camera-Equipped Mobile Terminal]

FIGS. 1A and 1B are perspective views showing the camera-equipped mobile phone 10 as an embodiment of an imaging apparatus and a camera-equipped mobile terminal of the invention. The camera module 20 as an embodiment of the camera module (lens driver) of the invention is incorporated in the camera-equipped mobile phone 10.

As shown in FIGS. 1A and 1B, the camera-equipped mobile phone 10 includes a display enclosure 11 (corresponding to a housing in the invention) and an operation enclosure 12 that is connected to the display enclosure 11 via a hinge 13 and can be opened and closed with respect to the display enclosure 11. FIG. 1A shows a state in which the display enclosure 11 is closed and overlaid on the operation enclosure 12, and FIG. 1B shows a state in which the display enclosure 11 is opened with respect to the operation enclosure 12.

In the thus configured camera-equipped mobile phone 10, the camera module 20 is incorporated in the display enclosure 11, as shown in FIG. 1A. A sub-display 14 formed of a liquid crystal display panel or any other suitable component is provided on the exterior side of the display enclosure 11 in order to display time and other information. On the other hand, an operation section 15 on which a numeric keypad, function keys, and other components are arranged is provided on the exposed side of the operation enclosure 12, as shown in FIG. 1B. An image can be captured through the camera module 20 by operating the operation section 15. The image captured by the camera module 20 and other information are displayed on a main display 16 formed of a liquid crystal display panel or any other suitable component provided on the interior side of the display enclosure 11.

[Example of Control System for Controlling Imaging Apparatus and Camera-Equipped Mobile Terminal]

FIG. 2 is a block diagram showing the configuration of a camera control system for controlling the camera-equipped mobile phone 10 as an embodiment of the imaging apparatus and the camera-equipped mobile terminal of the invention.

As shown in FIG. 2, the camera-equipped mobile phone includes not only the camera module 20, the operation section 15, and the main display 16 but also a system control unit 17, a memory medium controller 18, a drive control unit 19.

The camera module 20 includes an imaging lens 21, a lens holder 22, and an imaging device 23. When an imaging operation is performed through the operation section 15, the imaging device 23 captures a subject image guided through the lens 21 and produces a captured image signal. The captured image signal is outputted to the system control unit 17, where the captured image signal is processed. Specifically, the system control unit 17 performs a variety of signal processing operations on the captured image signal from the imaging device 23 and produces a still image signal or a video image signal in a predetermined format. The memory medium controller 18 stores the produced image signal as image data in a memory. On the other hand, the memory medium controller 18 can read the stored image data and send it to the system control unit 17. The medium (memory) on which the image data is stored is, for example, a memory built in the camera-equipped mobile phone 10 or a memory card detachably loaded into a memory slot of the camera-equipped mobile phone 10.

The camera module 20 has an autofocus function and a zoom function. These functions are performed when the drive control unit 19 controls and moves the lens holder 22 (lens 21). Specifically, when the drive control unit 19 issues a control command, the lens holder 22 moves in the optical axis direction. As a result, the lens 21 secured in the lens holder 22 also moves in the optical axis direction, for example, for autofocus control.

<1. First Embodiment>

[Example of Cross-Section of Camera Module (Lens Driver)]

FIG. 3 is a cross-sectional view of a camera module 20a as an embodiment (first embodiment) of the camera module (lens driver) of the invention taken along a plane including the optical axis.

As shown in FIG. 3, the camera module 20a includes an imaging lens 21a, a lens holder 22a in which the lens 21a is secured, and an imaging device 23. Specifically, the lens holder 22a is a cylindrical member that secures the lens 21a therein. The imaging device 23 is disposed in a position on the optical axis of the lens 21a. The lens 21a is not limited to a single lens, but may be a group of lenses. The imaging device 23 is a CCD (Charge Coupled Device) image sensor, a CMOS (Complementary Metal Oxide Semiconductor) image sensor, or any other suitable image sensor.

The thus configured camera module 20a is fixed in the display enclosure 11 of the camera-equipped mobile phone 10 shown in FIGS. 1A and 1B. To this end, the camera module 20a further includes a lens housing 24a (corresponding to the housing in the invention) that accommodates the lens 21a and the lens holder 22a. The camera module 20a is incorporated in the camera-equipped mobile phone 10 by fixing the lens housing 24a in the display enclosure 11. The lens housing 24a may alternatively be integrated with the display enclosure 11 and housed therein.

The imaging device 23 is mounted on a substrate 26 attached to a device housing 25. The device housing 25 is fixed to the lens housing 24a in such a way that the imaging device 23 is disposed in a position on the optical axis of the lens 21a. The device housing 25 has an opening formed on the side close to the lens 21a. A transparent cover 27 is fixed in the opening to prevent dirt and dust from adhering to the imaging device 23.

Further, in the camera module 20a, the lens 21a and the lens holder 22a are movable in the optical axis direction in the lens housing 24a. To this end, plate springs 28 (corresponding to the spring member in the invention) that hold the lens 21a and the lens holder 22a movably in the optical axis direction in the lens housing 24a are provided between the lens 21a (lens holder 22a) and the lens housing 24a. Instead of the plate springs 28, coiled springs or any other variety of known spring members can be used.

To move the lens 21a and the lens holder 22a in the optical axis direction, a coil 31 is cylindrically wound around the lens holder 22a. On the other hand, a magnet 32 is disposed in the lens housing 24a in such a way that the magnet surrounds the coil 31. A yoke 33 having an L-shaped cross-section when taken along a plane including the optical axis is disposed between the magnet 32 and the lens housing 24a. The thus disposed coil 31, magnet 32, and yoke 33 form a linear motor that moves the lens 21a (lens holder 22a) in the optical axis direction.

The plate springs 28 are disposed in upper and lower spaces between the coil 31 and the lens housing 24a, and four of the plate springs 28 in the upper space and four of the plate springs 28 in the lower space hold the lens 21a (lens holder 22a) via the coil 31. Specifically, the plate springs are formed of upper plate springs 28a and lower plate springs 28b. The lens 21a (lens holder 22a) is elastically held by the upper plate springs 28a and the lower plate springs 28b in a well-balanced manner in the lens housing 24a. As a result, the plate springs 28a and 28b eliminate the need for a guide shaft or any other motion restricting member that restricts the motion of the lens 21a in the optical axis direction. The camera module 20a can thus be reduced in size. Since the spaces above and below the coil 31 are used to place the plate springs 28a and 28b, the provision of the plate springs 28a and 28b does not prevent size reduction.

The lens 21a (lens holder 22a) held by the plate springs 28a and 28b in the manner described above is in a neutral state (initial state) and located in the position that is close to the imaging device 23 and corresponds to infinity. From this state, the lens 21a can move a longer distance in the direction in which the lens 21a moves away from the imaging device 23 than in the direction in which the lens 21a approaches the imaging device 23. In this configuration, when no current is conducted through the coil 31, for example, when the camera-equipped mobile phone 10 (see FIGS. 1A and 1B) is started, the camera-equipped mobile phone 10 is in a pan-focus state, which allows a photographing user to perform imaging operations without any uncomfortable feeling. Further, the configuration that allows the pan-focus state to be achieved without current conduction contributes to reduction in power consumption.

On the other hand, when a current is conducted through the coil 31, the lens 21a in the pan-focus state moves away from the imaging device 23 in the optical axis direction. Specifically, since the linear motor is formed of the coil 31 attached to the lens holder 22a and the magnet 32/yoke 33 attached to the periphery of the lens housing 24a, the actuator produces a thrust force when a drive current in a certain direction supplied to the coil 31 causes an interaction between the magnetic field produced by the coil 31 and the magnetic field produced by the magnet 32. As a result, the lens 21a moves to a position where the produced thrust force balances with the reaction force of the plate springs 28 (the pressing force of the upper plate springs 28a and the pulling force of the lower plate springs 28b) (an upper position in FIG. 3).

The yoke 33 is provided to prevent any magnetic force from leaking out of the lens housing 24a (away from the coil 31) and allow the magnet 32 to show its full performance. To this end, the yoke 33 is disposed outside the magnet 32 and fixed to the magnet 32 by the magnetic force. The magnet 32 and the yoke 33, which has an L-shaped cross-section when taken along a plane including the optical axis, are disposed in such a way that the outer surface of the magnet 32 is in contact with the inner surface of the L-shape of the yoke 33 (mounted on a corner side 33a). This configuration allows the magnet 32 to be readily positioned with respect to the yoke 33.

[Example of Shape of Yoke in Camera Module (Lens Driver)]

Figure 4B:
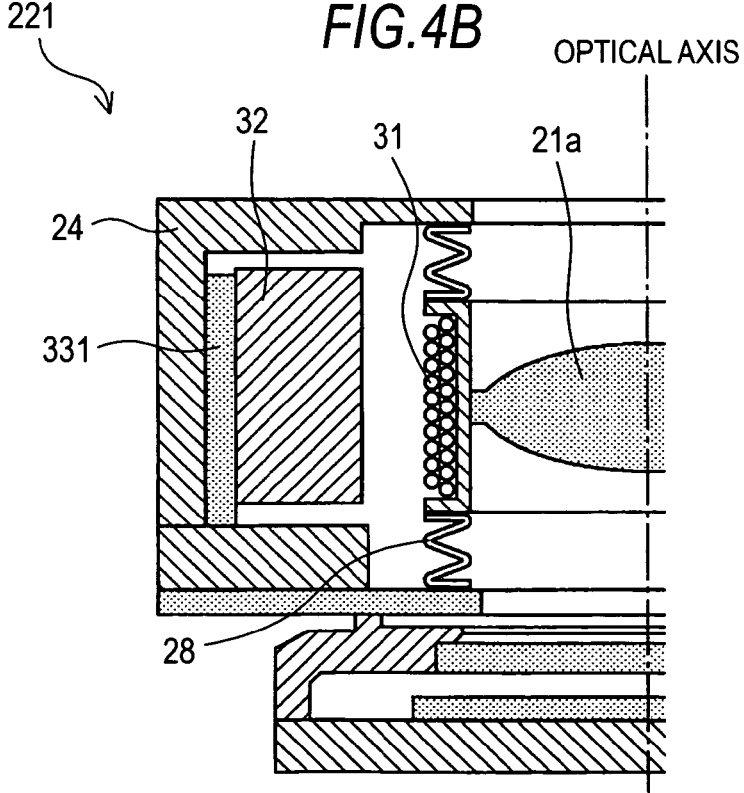

FIGS. 4A and 4B are cross-sectional views taken along a plane including the optical axis and describing an advantageous effect provided by the shape of the yoke 33 in the camera module 20a of the first embodiment. FIG. 4A shows a case according to the embodiment where the yoke 33 having an L-shaped cross-section when taken along a plane including the optical axis is used. FIG. 4B shows a case as a reference embodiment where a yoke 331 having an I-shaped cross-section when taken along a plane including the optical axis is used in a camera module 221.

As shown in FIG. 4A, when the yoke 33 has an L-shaped cross-section, the outer surface of the magnet 32 is brought into contact with the inner surface of the L-shape of the yoke 33 (mounted on the corner side 33a). In this case, the yoke 33 serves as a reference for receiving the magnet 32, and the outer surface of the L shaped yoke 33 serves as a reference used when the yoke 33 is incorporated in the lens housing 24a.

In this way, in the camera module 20a of the first embodiment, the magnet 32 and the yoke 33 can be precisely integrated into a unit. Further, the precision at which the magnet 32 and the yoke 33 are incorporated in the lens housing 24a can be readily increased, whereby the cost effectiveness and productivity can be improved. Moreover, since the magnet 32 is accurately positioned, the precision at which the magnet 32 is positioned with respect to the coil 31 is improved. As a result, variation in the thrust force produced by the actuator can be reduced. Further, an impact or any other external force will not cause the magnet 32 and the yoke 33 to be misaligned or separated from each other.

In contrast, when the cross-section has an I-shape (does not have an L-shape) when taken along a plane including the optical axis, like the yoke 331 according to the reference embodiment shown in FIG. 4B, and the same magnet 32 as that shown in FIG. 4A is used, there is no reference for receiving the magnet 32. It is therefore difficult to position the magnet 32 with respect to the yoke 331, and the magnet 32 may be misaligned with the yoke 331 in the vertical direction in FIG. 4B. As a result, the magnet 32 and the yoke 331 may not be precisely integrated into a unit.

Further, when the yoke 331 and the magnet 32 are incorporated in the same lens housing 24a as that shown in FIG. 4A, an end surface perpendicular to the optical axis direction is used as a reference in the incorporation operation. For example, in FIG. 4B, considering the positional relationship in the optical axis direction between the yoke 331 and magnet 32, the reference in the incorporation operation is the lower end surface of the yoke 331, which abuts the inner bottom of the lens housing 24a. However, if the lower end surface of the magnet 32 juts out from the yoke 331, the reference in the incorporation operation is the lower end surface of the magnet 32. Therefore, the precision at which the yoke 331 and the magnet 32 are incorporated in the lens housing 24a decreases, resulting in poor productivity. Further, the precision at which the magnet 32 is positioned with respect to the coil 31 decreases, which contributes to increase in variation in the thrust force produced by the actuator. Moreover, an impact or any other external force likely causes the magnet 32 and the yoke 331 to be misaligned or separated from each other, disadvantageously resulting in poor reliability.

Therefore, in the camera module 20a of the first embodiment, the L-shaped cross-section of the yoke 33 shown in FIG. 4A when taken along a plane including the optical axis advantageously improves the cost effectiveness and productivity. Other advantages are an ability to reduce variation in the thrust force produced by the actuator and an ability to prevent the magnet 32 and the yoke 33 from being misaligned or separated from each other when an impact or any other external force is applied.

However, since the corner side 33a of the L-shaped yoke 33 tends to attract the magnetic flux from the magnet 32, forming the yoke 33 into an L shape is disadvantageous in that the thrust force in the vicinity of the corner side 33a decreases. Specifically, the interaction between the magnetic field produced by the coil 31 and the magnetic field produced by the magnet 32 allows the actuator to produce a thrust force, which balances with the reaction force of the plate springs 28. In this case, the in-balance position where the thrust force produced by the actuator is minimized and the reaction force of the plate springs 28 is maximized is the farthest position the lens 21a can reach. Therefore, the relationship between the position of the corner side 33a of the L-shaped yoke 33 (a position where the thrust force decreases) and the position of the lens 21a where the reaction force of the plate springs 28 is maximized greatly affects the movable range of the lens 21a.

[Example of Orientation of Yoke in Camera Module (Lens Driver)]

Figure 5A:
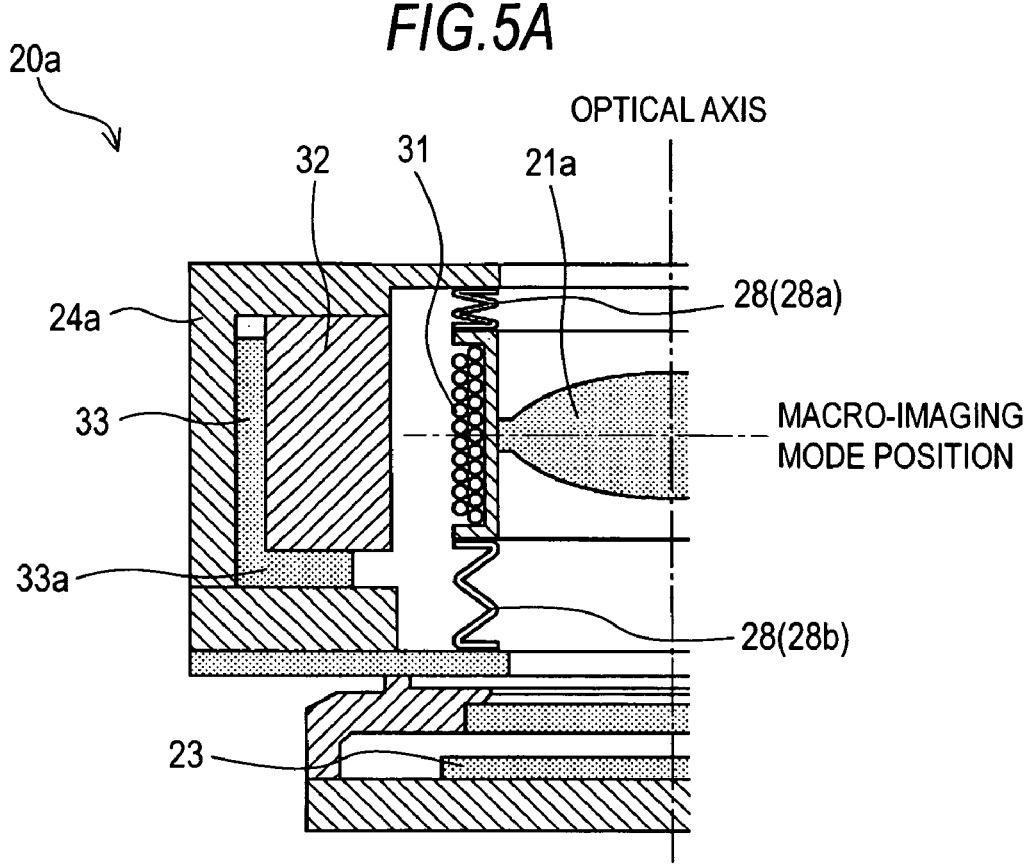
FIGS. 5A and 5B are cross-sectional views taken along a plane including the optical axis and describing an advantageous effect provided by the orientation of the yoke in the camera module of the first embodiment.
Figure 5B:
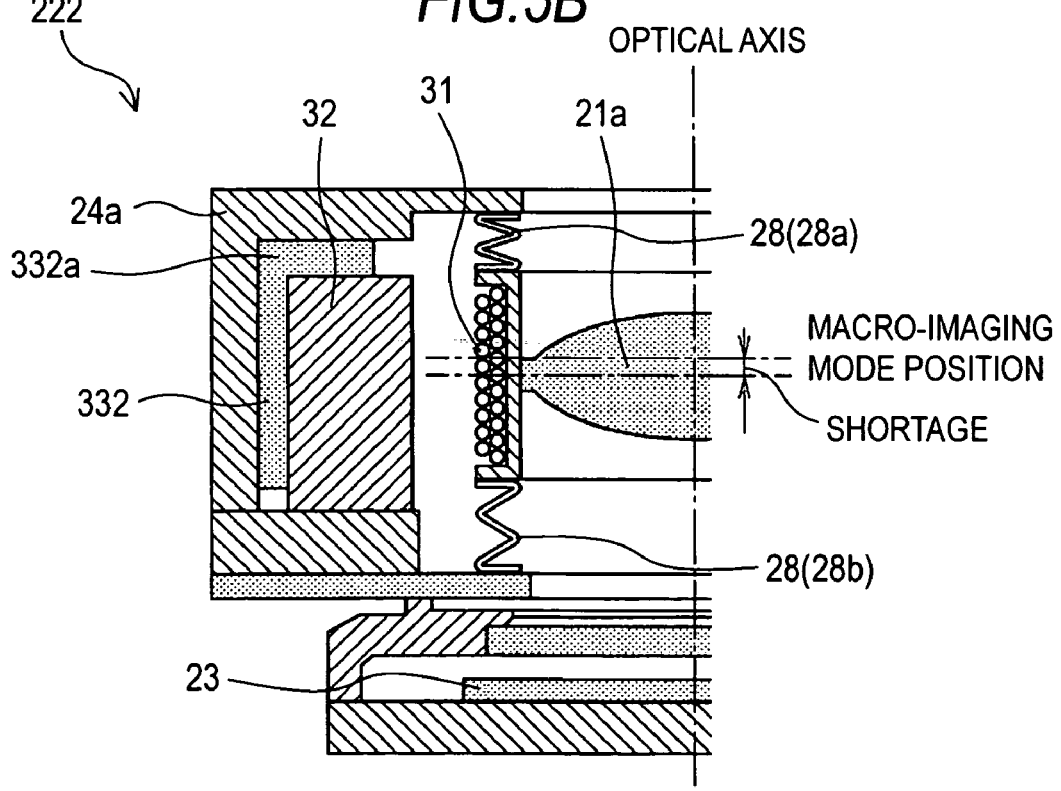

FIGS. 5A and 5B are cross-sectional views taken along a plane including the optical axis and describing an advantageous effect provided by the orientation of the yoke 33 in the camera module 20a of the first embodiment. FIG. 5A shows the orientation of the L-shaped yoke 33 according to the embodiment, and FIG. 5B shows the orientation of an L-shaped yoke 332 in a camera module 222 as a reference embodiment.

Figure 6:
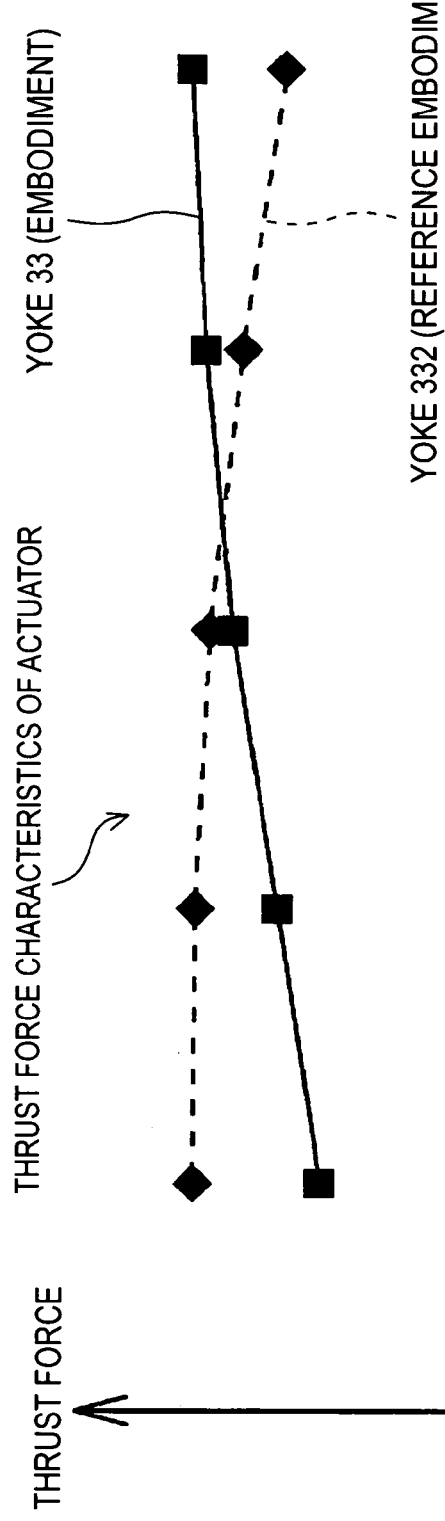
FIG. 6 shows graphs describing the advantageous effect provided by the orientation of the yoke in the camera module of the first embodiment.

FIG. 6 shows graphs describing the advantageous effect provided by the orientation of the yoke 33 in the camera module 20a of the first embodiment.

The yoke 33 in the embodiment shown in FIG. 5A is disposed in such a way that the L-shaped corner side 33a is located in a position close to the imaging device 23. The lens 21a is also located in a position close to the imaging device 23 in the neutral state of the plate springs 28 (the initial state of the lens 21a) (see FIG. 3). Therefore, the yoke 33 is disposed in such a way that the L-shaped corner side 33a and the lens 21a, which is located in a position where the reaction force of the plate springs 28 is minimized (zero), are located on the same side. Since no current is conducted through the coil 31 when the lens 21a is in the position of the initial state, the fact that the L-shaped corner side 33a of the yoke 33 attracts the magnetic flux from the magnet 32 will not be a problem.

On the other hand, the yoke 332 according to a reference embodiment shown in FIG. 5B is disposed in such a way that an L-shaped corner side 332a is located away from the imaging device 23. The yoke 332 is therefore disposed in such a way that the L-shaped corner side 332a is located on the opposite side to the position of the lens 21a where the reaction force of the plate springs 28 is minimized (zero). When the yoke 332 according to the reference embodiment is used as well, since no current is conducted through the coil 31 when the lens 21a is in the position of the initial state, the fact that the L-shaped corner side 332a of the yoke 332 attracts the magnetic flux from the magnet 32 will not be a problem.

When a current starts conducting through the coil 31 with the lens 21a located in the position of the initial state described above, the interaction between the magnetic field produced by the coil 31 and the magnetic field produced by the magnet 32 causes the actuator to produce a thrust force. As a result, the lens 21a moves away from the imaging device 23 in the optical axis direction. The lens 21a then moves to a position where the produced thrust force balances with the reaction force of the plate springs 28 (the pressing force of the upper plate springs 28a and the pulling force of the lower plate springs 28b).

Independent of whether the yoke 33 according to the embodiment shown in FIG. 5A is used or the yoke 332 according to the reference embodiment shown in FIG. 5B is used, the L-shaped corner side 33a (332a) attracts the magnetic flux from the magnet 32. However, when the yoke 33 according to the embodiment shown in FIG. 5A is used, the yoke 33 is disposed in such a way that the L-shaped corner side 33a is located on the opposite side to the position of the lens 21a where the reaction force of the plate springs 28 resulting from the movement of the lens 21a is maximized. Therefore, the thrust force produced by the actuator can be maximized when the lens 21a moves to the macro-imaging mode position where the reaction force of the plate springs 28 is maximized. As a result, the adverse effect due to the L-shaped corner side 33a, that is, attracting the magnetic flux from the magnet 32 reduces the thrust force of the actuator, can be minimized.

On the other hand, when the yoke 332 according to the reference form shown in FIG. 5B is used, the yoke 332 is disposed in such a way that the L-shaped corner side 332a and the lens 21a, which is located in the position where the reaction force of the plate springs 28 resulting from the movement of the lens 21a is maximized, are located on the same side. Therefore, when the lens 21a moves to the macro-imaging mode position and the reaction force of the plate springs 28 increases, the L-shaped corner side 332a attracts the magnetic flux from the magnet 32 and disadvantageously reduces the thrust force produced by the actuator. As a result, the necessary movement stroke is not provided, that is, the amount of movement of the lens 21a relative to the macro-imaging mode position is disadvantageously insufficient.

FIG. 6 shows thrust force characteristics of the actuator in the form of graph when the yoke 33 according to the embodiment shown in FIG. 5A is used and when the yoke 332 according to the reference embodiment shown in FIG. 5B is used. As shown in FIG. 6, in the characteristics provided when the yoke 33 according to the embodiment is used, the thrust force increases as the lens 21a moves from its position close to the imaging device 23 (where the reaction force of the plate springs 28 is small) to its position on the macro-imaging mode side (where the reaction force of the plate springs 28 is large). Conversely, in the characteristics provided when the yoke 332 according to the reference embodiment is used, the thrust force decreases as the lens 21a moves. In this case, the reaction force of the plate springs (see FIGS. 5A and 5B), which is larger than the reduced thrust force, disadvantageously causes a downward force in the optical axis direction (oriented toward the imaging device 23) to act on the lens 21a.

The thrust force characteristics described above have been confirmed by using a magnetism simulation. Specifically, a magnetism simulation that has been conducted to check the magnetic flux distribution indicates that the yoke 332 according to the reference embodiment shown in FIG. 5B produces an inverse magnetic flux (outward magnetic flux in the radial direction) on the macro-imaging mode side. However, the yoke 33 according to the embodiment shown in FIG. 5A produces no inverse magnetic flux. In this case, the thrust force characteristics shown in FIG. 6 are achieved, and the thrust force in the macro-imaging mode position provided by using the yoke 33 according to the embodiment is larger than that provided by using the yoke 332 according to the reference embodiment by approximately 10%.

As described above, the yoke 33 according to the embodiment can provide a thrust force necessary and sufficient to move the lens 21a to the macro-imaging mode position even in the maximum load condition in which the balance between the thrust force of the actuator and the reaction force of the plate springs 28 (see FIGS. 5A and 5B) is most difficult to achieve (the thrust force is minimized, whereas the reaction force is maximized). Further, variation in the magnetic force due to the influence of the L-shaped corner side 33a of the yoke 33 can be reduced, whereby the performance of the actuator can be stably maintained. Moreover, using the plate springs 28 eliminates the need for a guide shaft or any other motion restricting member that restricts the motion of the lens 21a in the optical axis direction, whereby the cost effectiveness and productivity are improved and the camera module 20a is reduced in size. Still further, variation in terms of parts and manufacturing processes decreases. A reasonable camera module 20a is thus provided.

<2. Second Embodiment>
[Example of Cross-Section of Camera Module (Lens Driver)]

Figure 7:
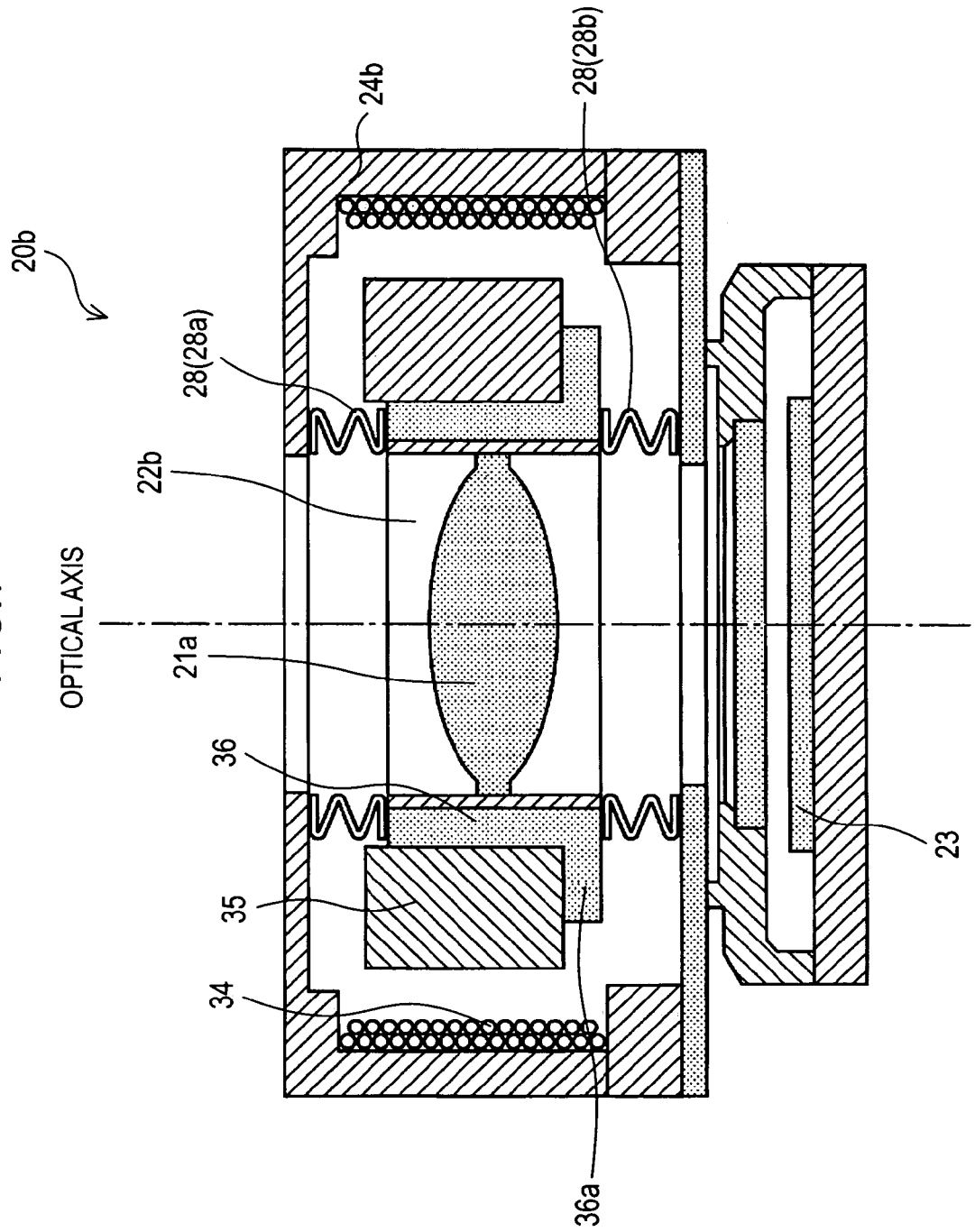
FIG. 7 is a cross-sectional view of a camera module taken along a plane including the optical axis as an embodiment (second embodiment) of the camera module (lens driver) of the invention.

FIG. 7 is a cross-sectional view of a camera module 20b taken along a plane including the optical axis as an embodiment (second embodiment) of the camera module (lens driver) of the invention.

As shown in FIG. 7, the camera module 20b of the second embodiment includes an imaging lens 21a and an imaging device 23, which are the same as those in the camera module 20a of the first embodiment (see FIG. 3). The camera module 20b further includes plate springs 28 that hold the lens 21a movably in the optical axis direction.

To move the lens 21a in the optical axis direction, a yoke 36 having an L-shaped cross-section when taken along a plane including the optical axis is disposed outside a lens holder 22b in the camera module 20b of the second embodiment. A magnet 35 is then fixed to the outer surface of the yoke 36. A coil 34 is cylindrically wound along the inner surface of a lens housing 24b so that the coil 34 surrounds the magnet 35. The thus disposed coil 34, magnet 35, and yoke 36 (disposed in an inside-out manner with respect to those in the camera module 20a of the first embodiment shown in FIG. 3) form a linear motor that moves the lens 21a (lens holder 22b) in the optical axis direction. Therefore, when a current is conducted through the coil 34, the actuator produces a thrust force.

When the inner surface of the magnet 35 is brought into contact with the inner surface of the L shape of the yoke 36, the yoke 36 serves a reference for receiving the magnet 35. Therefore, the magnet 35 and the yoke 36 can be precisely integrated into a unit in the camera module 20b of the second embodiment as well, whereby the precision at which the magnet 35 and the yoke 36 are incorporated in the lens housing 24b increases and the cost effectiveness and productivity are improved.

Further, the plate springs 28 are disposed in upper and lower spaces between the magnet 35/yoke 36 and the lens housing 24b, and four of the plate springs 28 in the upper space and four of the plate springs 28 in the lower space hold the lens 21a (lens holder 22b) via the magnet 35 or the yoke 36. Specifically, the plate springs 28 are formed of upper plate springs 28a and lower plate springs 28b. The lens 21a (lens holder 22b) is elastically held in the lens housing 24b by the upper plate springs 28a and the lower plate springs 28b in a well-balanced manner in the lens housing 24a. As a result, the plate springs 28a and 28b eliminate the need for a guide shaft or any other motion restricting member that restricts the motion of the lens 21a in the optical axis direction. The camera module 20b can thus be reduced in size. Since the spaces above and below the magnet 35/yoke 36 are used to place the plate springs 28a and 28b, the provision of the plate springs 28a and 28b does not prevent size reduction.

In the camera module 20b of the second embodiment described above, the yoke 36 is disposed in such a way that an L-shaped corner side 36a is located on the opposite side to the position of the lens 21a where the reaction force of the plate springs 28 resulting from the movement of the lens 21a is maximized. Therefore, the thrust force produced by the actuator can be maximized when the lens 21a moves away from the imaging device 23 to the macro-imaging mode position where the reaction force of the plate springs 28 is maximized. As a result, the adverse effect due to the L-shaped corner side 36a, that is, attracting the magnetic flux from the magnet 35 reduces the thrust force of the actuator, can be minimized. Further, since the camera module 20b of the second embodiment can produce a thrust force necessary and sufficient to move not only the lens 21a but also the magnet 35 and the yoke 36, which are heavier than the coil 34.

<3. Third Embodiment>
[Example of Cross-Section of Camera Module (Lens Driver)]

Figure 8:
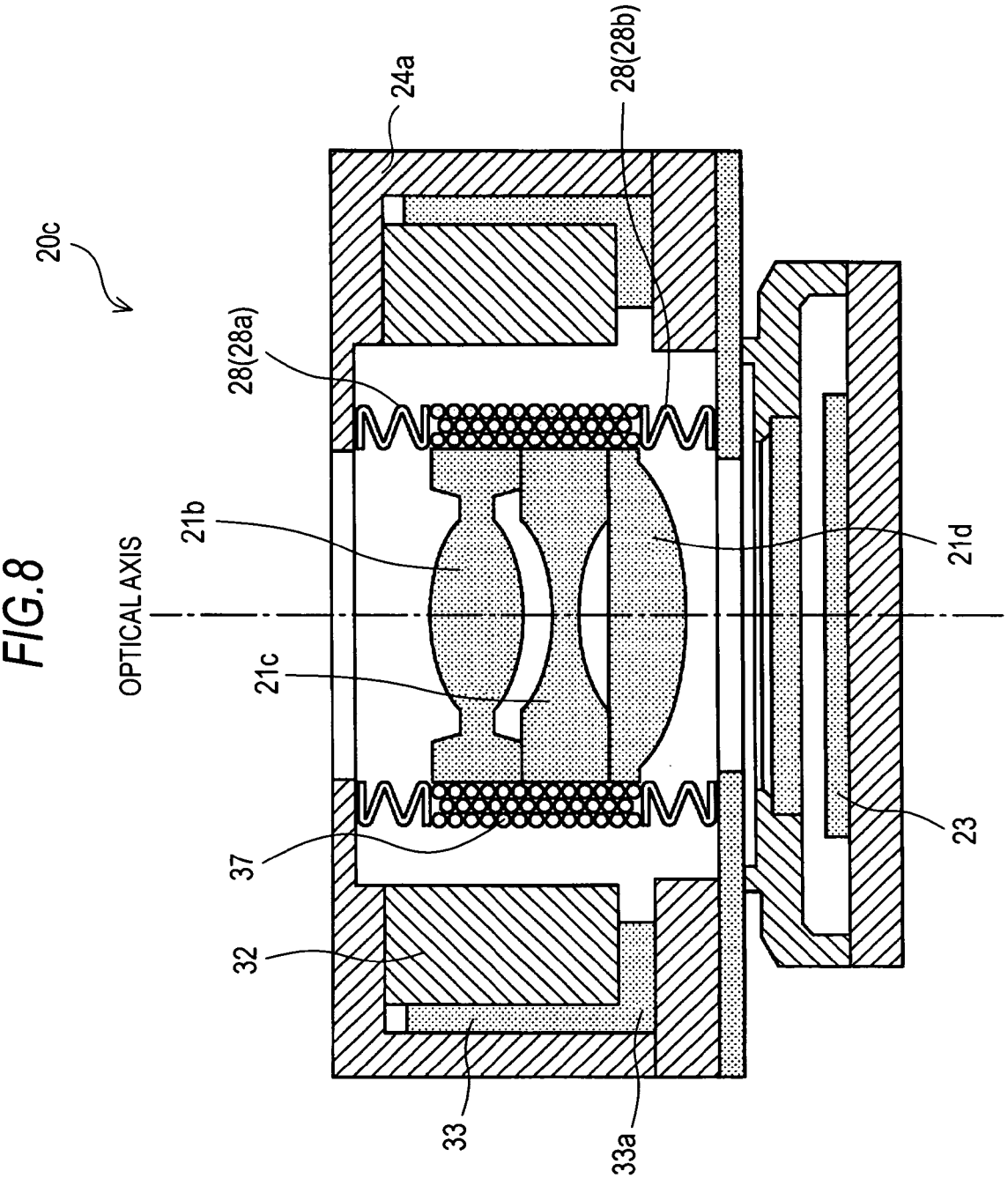
FIG. 8 is a cross-sectional view of a camera module taken along a plane including the optical axis as an embodiment (third embodiment) of the camera module (lens driver) of the invention.

FIG. 8 is a cross-sectional view of a camera module 20c taken along a plane including the optical axis as an embodiment (third embodiment) of the camera module (lens driver) of the invention.

As shown in FIG. 8, the camera module 20c of the third embodiment includes three lenses 21b, 21c, and 21d that are made of glass, synthetic resin, or any other suitable non-conductive material and guide a subject image to the imaging device 23. The lenses 21b, 21c, and 21d are joined with each other with their optical axes aligned by using an adhesive applied to their outer circumferential surfaces.

To move the lenses 21b, 21c, and 21d in the optical axis direction, a coil 37 is provided. The coil 37 is cylindrically wound around the lenses 21b, 21c, and 21d and attached thereto. Therefore, the camera module 20c of the third embodiment shown in FIG. 8 is similar to the camera module 20a of the first embodiment shown in FIG. 3 but differs therefrom in that the lens holder 22a is omitted. However, since the lenses 21b, 21c, and 21d are made of glass, synthetic resin, or any other suitable non-conductive material, directly winding the coil 37 around the lenses will not produce any problem. Alternatively, the coil 37 may first be formed into a cylindrical shape, which is then glued, press-fitted, or fused with the lenses 21b, 21c, and 21d.

On the other hand, a lens housing 24a, a magnet 32, a yoke 33, and other components are the same as those in the camera module 20a of the first embodiment (see FIG. 3). The yoke 33 having an L-shaped cross-section when taken along a plane including the optical axis is disposed on the inner surface of the lens housing 24a, and the magnet 32 is disposed on the inner surface of the L shape of the yoke 33. Therefore, the magnet 32 surrounds the coil 37, and the magnet 32 and the coil 37 form a linear motor that moves the lenses 21b, 21c, and 21d in the optical axis direction.

The magnetic field in the vicinity of a corner side 33a of the L-shaped yoke 33 is oriented opposite to the magnetic field from the magnet 32 toward the coil 37. Therefore, when the lenses 21b, 21c, and 21d are located in the vicinity of the corner side 33a of the yoke 33, a force oriented opposite to the direction in which the lenses 21b, 21c, and 21d move is disadvantageously produced. However, since the corner side 33a of the yoke 33 is disposed in a position close to the imaging device 23, the thrust force will not be insufficient even when the lenses 21b, 21c, and 21d move away from the imaging device 23 toward the macro-imaging mode position where the load increases.

Therefore, the camera module 20c of the third embodiment can provide a thrust force necessary and sufficient to move the lenses 21b, 21c, and 21d to the macro-imaging mode position without the lens holder 22a (see FIG. 3). Further, omitting the lens holder 22a is advantageous for size reduction. In particular, even when a strong need to reduce the camera-equipped mobile phone 10 (see FIGS. 1A and 1B) in size and thickness leaves a limited narrow space, the camera module 20c is readily incorporated.

<4. Fourth Embodiment>
[Example of Cross-Section of Camera Module (Lens Driver)]

Figure 9:
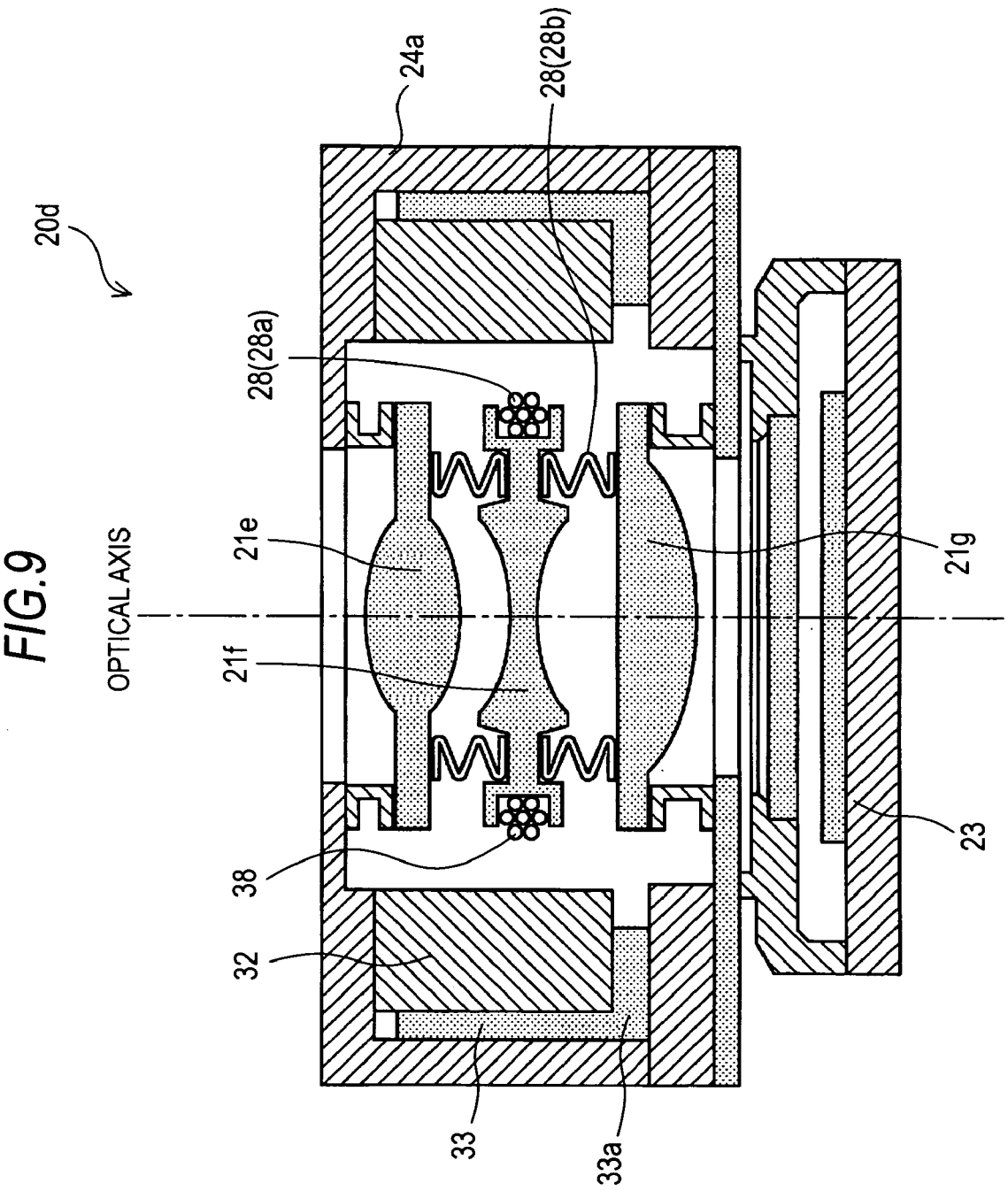
FIG. 9 is a cross-sectional view of a camera module taken along a plane including the optical axis as an embodiment (fourth embodiment) of the camera module (lens driver) of the invention.

FIG. 9 is a cross-sectional view of a camera module 20d taken along a plane including the optical axis as an embodiment (fourth embodiment) of the camera module (lens driver) of the invention.

As shown in FIG. 9, the camera module 20d of the fourth embodiment includes three lenses 21e, 21f, and 21g that guide a subject image to the imaging device 23. The lenses 21e and 21g are fixed to a lens housing 24a. On the other hand, the lens 21f is held movably in the optical axis direction by plate springs 28 provided between the lenses 21e and 21g.

Further, to move the lens 21f alone in the optical axis direction, a coil 38 is cylindrically wound around the lens 21f. On the other hand, a yoke 33 having an L-shaped cross-section when taken along a plane including the optical axis is disposed on the inner surface of the lens housing 24a, and a magnet 32 is fixed to the inner surface of the L shape of the yoke 33. Therefore, the magnet 32 surrounds the coil 38, and the magnet 32 and the coil 38 form a linear motor that moves the lens 21f in the optical axis direction. The lens housing 24a, the magnet 32, the yoke 33, and other components are the same as those in the camera module 20a of the first embodiment (see FIG. 3).

Therefore, in the camera module 20d of the fourth embodiment, only the middle lens 21f of the three lenses 21e, 21f, and 21g can be moved alone. An autofocus function and a zoom function can be achieved by using the lens 21f for focusing and zooming purposes. Since an L-shaped corner side 33a of the yoke 33 is disposed in a position close to the imaging device 23, the thrust force will not be insufficient even when the lens 21f moves to a position away from the imaging device 23 where the load increases.

While the embodiments of the invention have been described above, the invention is not limited thereto but a variety of changes can be made thereto. For example, the camera-equipped mobile phone 10 has been presented by way of example of the imaging apparatus and the camera-equipped mobile terminal in the embodiments. Instead, the invention is widely applicable to imaging apparatus, such as digital still cameras and video camcorders, and camera-equipped mobile terminals, such as PDAs and notebook personal computers into which a camera module is incorporated.

It should be understood by those skilled in the art that various modifications, combinations, sub-combinations and alterations may occur depending on design requirements and other factors insofar as they are within the scope of the appended claims or the equivalents thereof.

What is claimed is:

1. A lens driver comprising:
an imaging lens;
a housing accommodating the lens;
a spring member provided between the lens and the housing and holding the lens in the housing movably in the optical axis direction;
a coil moving the lens in the optical axis direction, the coil being directly attached to the lens or to a lens holder that is directly attached to the lens;
a magnet spaced apart from the coil and moving the lens in the optical axis direction; and
a yoke fixed to the magnet and having an L-shaped cross-section when taken along a plane including the optical axis,
wherein the yoke is disposed in such a way that an L-shaped corner side is located on the opposite side to the position of the lens where the reaction force of the spring member resulting from the movement of the lens is maximized,
wherein the lens holder is cylindrical, secures the lens within the lens driver, and can move in the optical axis direction along with the lens,
wherein the coil is cylindrically wound around the lens holder,
the magnet is disposed in an area close to the housing in such a way that the magnet surrounds the coil, and
the yoke is disposed in such a way that the outer surface of the magnet is in contact with the inner surface of the L-shaped yoke.

* * * * *